United States Patent
Kikuta et al.

(10) Patent No.: US 6,508,485 B2
(45) Date of Patent: Jan. 21, 2003

(54) HORN SWITCH FOR A STEERING WHEEL

(75) Inventors: Mitsuhiro Kikuta, Aichi-ken (JP); Yoshiyuki Fujita, Aichi-ken (JP); Hiroshi Yasuda, Aichi-ken (JP); Yuji Sekitomi, Obu (JP); Toshihiro Kimura, Obu (JP)

(73) Assignees: Toyoda Gosei Co., Ltd., Aichi-ken (JP); Matsuo Industries Inc., Obu (JP)

(*) Notice: Subject to any disclaimer, the term of this patent is extended or adjusted under 35 U.S.C. 154(b) by 0 days.

(21) Appl. No.: 09/852,143

(22) Filed: May 10, 2001

(65) Prior Publication Data

US 2002/0011721 A1 Jan. 31, 2002

(30) Foreign Application Priority Data

May 12, 2000 (JP) ......................................... 2000-140797

(51) Int. Cl.[7] ............................. B60R 21/16; H01H 9/00
(52) U.S. Cl. ................. 280/728.2; 280/731; 200/61.54
(58) Field of Search ............................. 280/731, 728.2; 200/61.54, 61.55

(56) References Cited

U.S. PATENT DOCUMENTS

| | | | | |
|---|---|---|---|---|
| 4,808,776 A | * | 2/1989 | Niwa et al. | 200/61.55 |
| 5,023,412 A | * | 6/1991 | Ishida | 200/61.54 |
| 5,228,362 A | * | 7/1993 | Chen et al. | 74/552 |
| 5,235,146 A | * | 8/1993 | Suzuki | 200/61.54 |
| 5,283,404 A | * | 2/1994 | Prescaro, Jr. | 200/61.54 |
| 5,410,114 A | * | 4/1995 | Furuie et al. | 200/61.55 |
| 5,508,482 A | * | 4/1996 | Martin et al. | 200/61.55 |
| 5,593,178 A | * | 1/1997 | Shiga et al. | 280/731 |
| 5,597,177 A | * | 1/1997 | Matsuura | 280/731 |
| 5,650,600 A | * | 7/1997 | Walters | 200/61.54 |
| 5,950,494 A | * | 9/1999 | Sugiyama | 74/484 H |
| 6,062,592 A | * | 5/2000 | Sakurai et al. | 280/728.2 |
| 6,139,051 A1 | * | 10/2001 | Fujita | 280/731 |

FOREIGN PATENT DOCUMENTS

| | | | |
|---|---|---|---|
| JP | 8-225051 | * | 9/1996 |
| JP | 10-106382 | * | 4/1998 |

* cited by examiner

*Primary Examiner*—Paul N. Dickson
*Assistant Examiner*—Laura B. Rosenberg
(74) *Attorney, Agent, or Firm*—Pillsbury Winthrop LLP

(57) ABSTRACT

A horn switch includes a stationary member, a movable member, a spring and a connecting bolt. The stationary member has a stationary contact and is supported on a steering wheel body. The movable member has a movable contact and is arranged above the stationary member. The connecting bolt allows downward movements of the movable member and prescribes a distance of the movable contact from the stationary contact. The connecting bolt is provided with a head and a shank. The head abuts against an underside of the stationary member. The shank extends upward from the head to be fastened to a threaded hole in the movable member. Prior to fastening, the connecting bolt is temporarily fixed to the stationary member by latch legs. The latch legs latch a lower surface of the head in a manner to permit the connecting bolt to be fastened to the movable member.

12 Claims, 12 Drawing Sheets

HORN SWITCH FOR A STEERING WHEEL

BACKGROUND OF THE INVENTION

This application claims priority from Japanese application No. 2000-140797, which is hereby incorporated by reference into this application.

1. Field of the Invention

The invention relates to a horn switch arranged on a steering wheel for vehicles. More specifically, the invention relates to a horn switch provided with a connecting bolt, by which a movable member being depressed is connected to a stationary member to enable operation of the horn switch.

2. Description of Related Art

Conventionally, a horn switch of this kind is known as described in Japanese Patent Laid-Open No. 106382/1998 and the like. The horn switch disclosed in the above-mentioned publication comprises a stationary member supported on a steering wheel body and a movable member connected to a horn pad. The stationary member includes a stationary contact. The movable member includes a movable contact adapted to touch with the stationary contact to enable actuating a horn. The movable member is arranged above the stationary member.

A spring is arranged between the stationary member and the movable member to bias the movable contact away from the stationary contact. Also, a connecting bolt is arranged between the stationary member and the movable member to connect the movable member to the stationary member. The connecting bolt is arranged to allow downward movement of the movable member and to prescribe a distance of the movable contact from the stationary contact. The connecting bolt comprises a head and a shank extending upward from the head. The head is adapted to abut against an underside of the stationary member. The shank is fastened to a threaded hole in the movable member.

However, such a conventional connecting bolt is designed to extend through the stationary member from below the stationary member to be fastened to the movable member. Therefore, there is the possibility of the connecting bolt falling if it becomes loose.

Also, at the time of fastening of the connecting bolt, the stationary member and the movable member must be positioned so as not to deviate from each other. After such positioning, the connecting bolt is inserted through the stationary member to be fastened to the threaded hole in the movable member. Therefore, it is conventional that a plurality of positioning holes are provided around the threaded hole on the movable member and positioning projections provided on the stationary member are fitted into the positioning holes, thus facilitating fastening of the connecting bolt to the movable member.

A plurality of such connecting bolts are arranged at fastening locations on the entire steering wheel and rotated to be fastened to the movable member. Therefore, the movable member is sometimes subjected to rotative torque at the time of fastening a connecting bolt. In this case, the positioning projections get out of the positioning holes at other fastening locations of other connecting bolts to cause positional deviation, which takes time to correct, adding time to the operation of fastening the connecting bolts.

SUMMARY OF THE INVENTION

Aspects of the invention address or solve the above-mentioned problems. One aspect of the invention provides a horn switch for a steering wheel which is capable of preventing the falling of a connecting bolt even in the event of its becoming loose, and in which the fastening operation of a connecting bolt is made easier.

These and other aspects of the invention can be attained by providing a horn switch for a steering wheel constituted in the following manner.

A horn switch for a steering wheel comprises a stationary member having a stationary contact and supported on a steering wheel body, and a movable member having a movable contact, which touches the stationary contact to enable actuating a horn, arranged above the stationary member. A spring is arranged between the stationary member and the movable member for biasing the movable contact upward so as to space the same away from the stationary contact. A connecting bolt connects the movable member to the stationary member so as to allow downward movement of the movable member and to prescribe a distance of the movable contact from the stationary contact. The connecting bolt comprises a head abutting against an underside of the stationary member and a shank extending upward from the head to be fastened to a threaded hole in the movable member. The connecting bolt is capable of being temporarily fixed to the stationary member with a lower surface of the head latched and is capable of being fastened to the movable member when temporarily fixed to the stationary member.

With the horn switch according to the invention, the connecting bolt is temporarily fixed to the stationary member before tightening. Therefore, a lower surface of the head is latched even if the connecting bolt becomes loose, thus eliminating the possibility of its falling.

Of course, when being fastened to the movable member, the connecting bolt is only temporarily fixed to the stationary member with the lower surface of the head being latched. At this time, the shank extending from the head extends toward the threaded hole of the movable member. Therefore, the shank of the connecting bolt is fitted into the threaded hole only by mounting a jig, such as a driver or the like, on the head of the connecting bolt and pushing and turning the same. As a result, the connecting bolt can be fastened to the movable member without trouble.

Accordingly, with a horn switch for a steering wheel according to the invention, the falling of a connecting bolt can be prevented even in the event of its becoming loose, and the fastening operation of a connecting bolt can be made with ease.

Also, with the above-mentioned horn switch, it is preferable that the stationary member comprises a stationary base connected to the steering wheel body and a stationary support member connected to the stationary base for supporting the stationary contact. The stationary support member preferably comprises a joint portion capable of joining to a mount hole of the stationary base. The stationary support member is formed with latch legs, which project below an underside of the stationary base when the joint portion is joined with the mount hole, being capable of temporarily fixing the connecting bolt.

With the horn switch thus constituted, the latch legs provided on the stationary support member being capable of temporarily fixing the connecting bolt are mounted on the stationary base by joining a joint portion of the stationary support member, which supports the stationary contact, to a mount hole of the stationary base. Accordingly, mounting of other members for temporarily fixing the connecting bolt to the stationary member is dispensed with. As a result, it is possible to reduce the number of constituent parts for the horn switch and man-hours for assembly.

Further, with the above-mentioned horn switch, it is preferable that the movable member comprises a movable base connected to a pad, which is depressed to enable operation of the horn switch, and has a threaded hole, and a movable support member connected to the movable base to support the movable contact, By this arrangement, the stationary contact, the movable contact, the stationary support member, the movable support member and the spring are formed to have a substantially cylindrical shape provided with an insertion hole, which permits the shank of the connecting bolt to be inserted therethrough. The stationary support member and the movable support member, which support the stationary contact and the movable contact, respectively, are constructed to engage with each other to enable a switch assembly to be formed in a state in which they interpose the spring therebetween and allow downward movement of the movable support member.

With the horn switch thus constituted, the switch assembly can be formed in a state in which the stationary support member and the movable support member, which support the stationary contact and the movable contact, respectively, are made to engage with each other with the spring interposed therebetween. At this time, the engagement is effected in a state in which the movable support member is allowed to move downward. Therefore, it is possible to handle the stationary and movable contacts, the stationary and movable support members, and the spring without losing them, which is convenient in handling, such as during mounting to the stationary base thereafter. And the stationary and movable contacts, the stationary and movable supporting members and the spring, which constitute the switch assembly, are formed to have a substantially cylindrical shape provided with an insertion hole. The insertion hole permits the shank of the connecting bolt to be inserted therethrough. Therefore, there is no possibility of interfering with the connecting bolt, which is to be temporarily fixed to the stationary member.

Further, with the horn switch described above, a cover portion is preferably formed on either of the stationary support member and the movable support member to be capable of covering an area surrounding the contact portions at which the stationary contact and the movable contact touch each other in operation of the horn switch.

With the horn switch thus constituted, the cover portion provided on either of the stationary support member and the movable support member covers an area surrounding the contact portions at which the stationary contact and the movable contact touch each other in operation of the horn switch. Therefore, foreign matters can be prevented from entering between the contact portions, at which the stationary contact and the movable contact touch each other in operation of the horn switch.

Further, with the horn switch described above, it is preferable that the threaded hole formed on the movable base is formed with a tapered guide surface at a peripheral edge of a lower end thereof.

With the horn switch thus constituted, threading of the male thread portion is facilitated when the connecting bolt is fastened to the threaded hole. Therefore, it is possible to improve work efficiency in mounting of the horn switch.

Further, with the horn switch described above, it is preferable that the shank of the connecting bolt comprises a male thread portion formed at an upper end thereof to be capable of threading into the threaded hole, and a large-diameter portion formed at a lower end thereof to be larger in outer diameter than the male thread portion. The connecting bolt is adapted to be threaded into the threaded hole with a washer, which has the same outer diameter as that of the large-diameter portion, between the large-diameter portion and the movable member.

With the horn switch thus constituted, when the connecting bolt is to be fastened to the threaded hole, they interpose therebetween the washer without interposition of the movable support member and the movable contact, so that the large-diameter portion abuts directly against the movable base. Therefore, there is no possibility of the movable support member and the movable contact being deformed. Of course, it is possible to fasten the connecting bolt to the movable base with the washer therebetween in a state in which fastening forces are enhanced.

Further, with the horn switch described above, it is preferable that the stationary support member and the movable support member are each formed with engagements which cause engagement therebetween. The engagements are preferably formed around the connecting bolt to be disposed in four positions spaced circumferentially uniformly from one another.

With the horn switch thus constituted, the engaging portions at which the stationary support member and the movable support member engage with each other are separated uniformly around the connecting bolt. Therefore, the stationary support member and the movable support member can be stably engaged with each other.

Further, with the horn switch described above, it is preferable that the movable member corrects and supports an airbag device.

With the horn switch thus constituted, the airbag device and the horn switch are beforehand assembled together, and the airbag device and all other parts can be mounted to the steering wheel body making use of the stationary members of the horn switches. Therefore, it becomes easy to assemble the steering wheel body. That is, in the case of directly mounting a small horn switch on a large steering wheel body, the ring section of the steering wheel body creates interference, making assembly difficult. However, in the case of mounting a horn switch on an airbag device smaller than a steering wheel body, there are fewer parts creating interference, thereby making assembly easier. This is because it is easy to find any part or parts which fall.

Further, with the horn switch described above, it is preferable that the movable base is formed integrally with a bag holder, which constitutes the airbag device, and is die-cast.

With the horn switch thus constituted, it becomes unnecessary to arrange on the bag holder any nuts provided with threads for threading of the male threaded portions of the fastening bolts, thus reducing the man-hours required for manufacture of the bag holder and reducing or eliminating costs.

DESCRIPTION OF PREFERRED EMBODIMENTS

Figure 1:
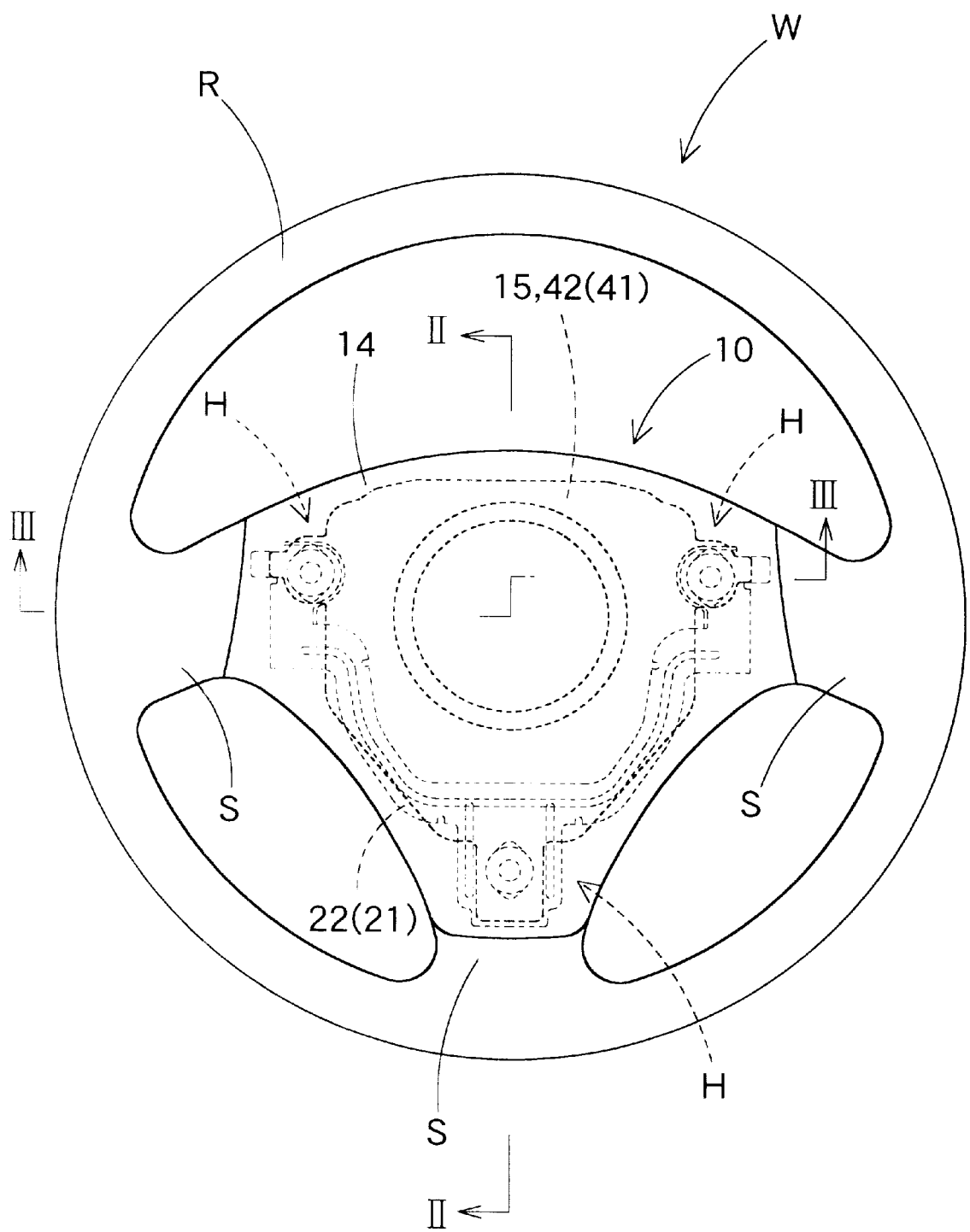
FIG. 1 is a plan view showing a steering wheel, for which a horn switch according to an embodiment of the invention is used.

The invention will be described below with respect to embodiments shown in the drawings. In addition, the invention is not limited to these embodiments and is intended to include all modifications or equivalents thereof.

Figure 2:
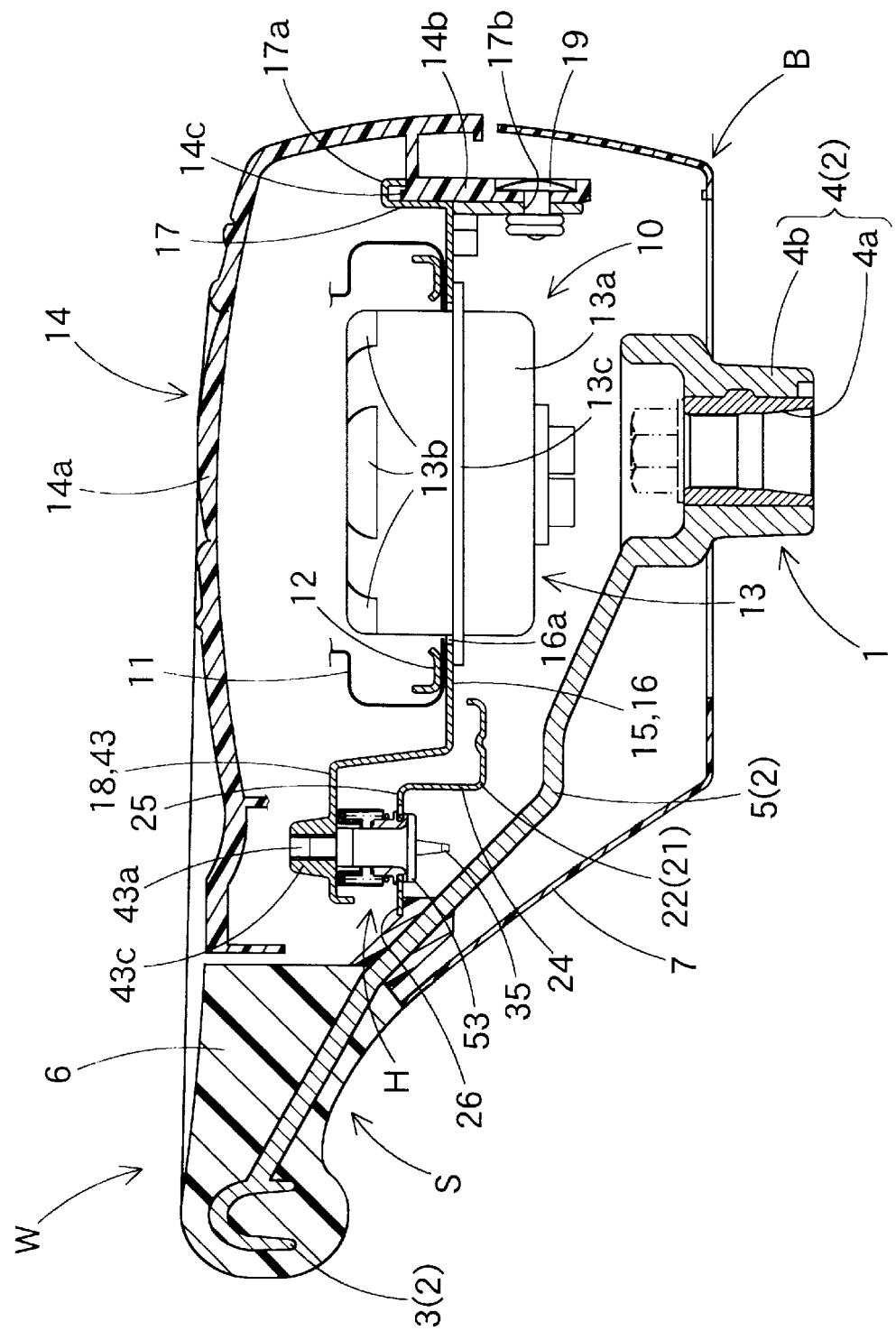
FIG. 2 is a schematic, cross sectional view of the steering wheel taken along the line II—II in FIG. 1.
Figure 3:
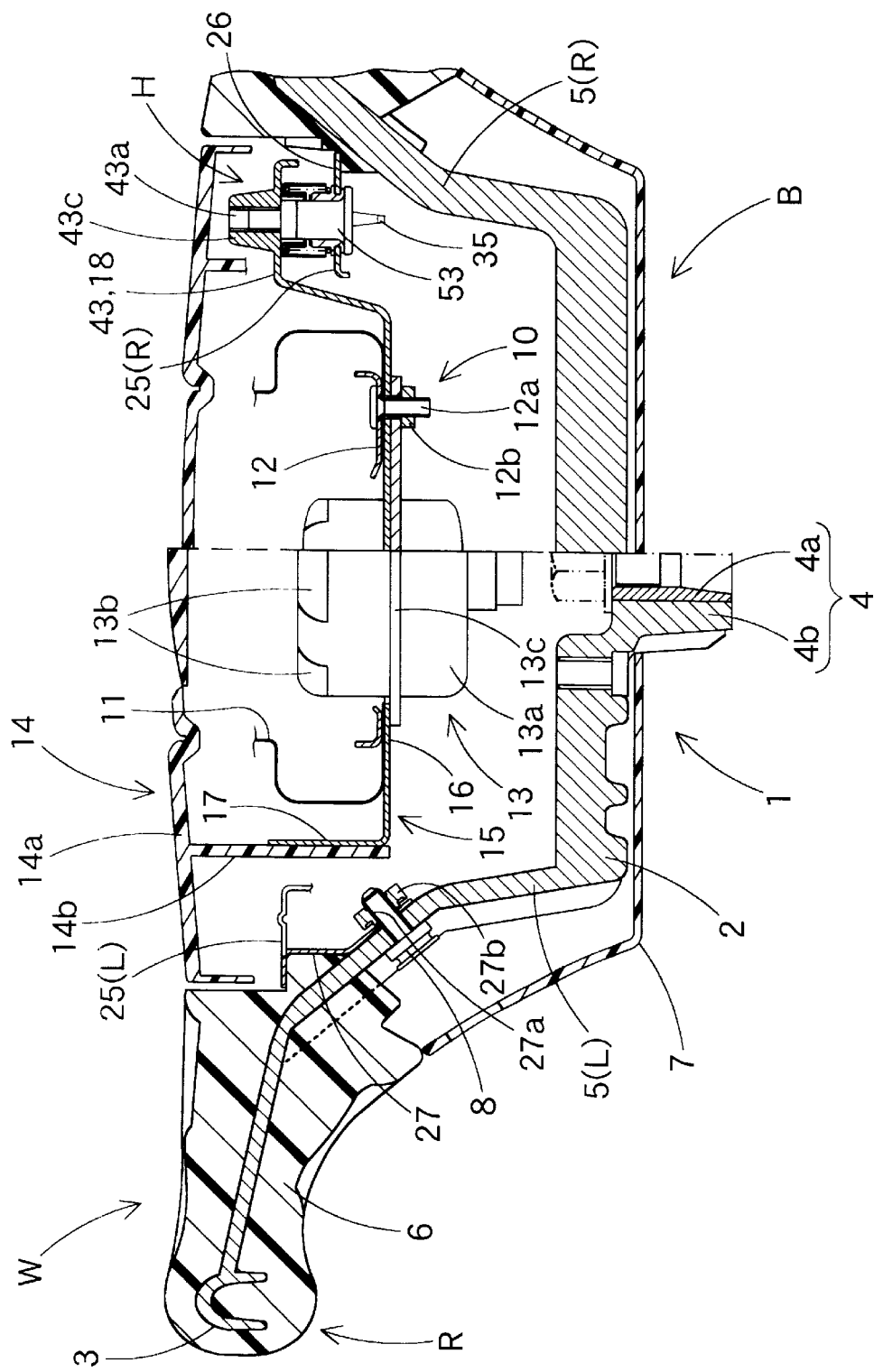
FIG. 3 is a schematic, cross sectional view of the steering wheel taken along the line III—III in FIG. 1.

A steering wheel W including a horn switch H according to an embodiment of the invention comprises, as shown in FIGS. 1 to 3, a torus-shaped ring section R, a boss section B disposed centrally with respect to the ring section R, and three spoke sections S connecting the ring section R and the boss section B to each other. Also, the steering wheel W comprises other constituent parts, that is, a steering wheel body 1, an airbag device 10 arranged above the boss section B, and the horn switches H. The horn switches H are connected to the steering wheel body 1 that supports the airbag device 10.

The steering wheel body 1 indicates a section separate from the airbag device 10 and the horn switches H. The steering wheel body 1 comprises a core metal 2 arranged to connect respective sections including the ring section R, the boss section B and the spoke sections S. A ring section core metal 3, part of the core metal 2, and respective spoke section core metals 5 formed integrally to the side of the ring section core metal 3 are covered with a covering layer 6, preferably made of synthetic resin. A core metal 4 at the boss section B comprises a steel boss 4a and a covering section 4b made of aluminum alloy or the like. The boss 4a is connected to a steering shaft (not shown). The covering section 4b covers an outer surface of the boss 4a and is formed integrally with the ring section core metal 3 and the spoke section core metals 5. In addition, the steering wheel body 1 comprises a lower cover 7 screwed or otherwise fastened onto the core metal 2 in a manner to cover a lower portion of the boss section B.

The airbag device can embody any known configuration. Preferably, the airbag device 10 comprises, as shown in FIGS. 2 and 3, a bag-shaped airbag 11, an inflator 13, a pad 14, and a bag holder 15. The airbag 11 is folded in an expandable manner. The inflator 13 supplies an expansion gas to the airbag 11. The pad 14 covers the folded airbag 11. The bag holder 15 holds the airbag 11, the inflator 13 and the pad 14.

The inflator 13 comprises a substantially column-shaped body portion 13a, and a flange portion 13c extending from an outer peripheral surface of the body portion 13a. Gas discharge ports 13b are formed on an upper portion of the body portion 13a.

The pad 14 is made of a synthetic resin to comprise a roof wall portion 14a and side wall portions 14b. The roof wall portion 14a is designed so that predetermined portions are broken at the time of expansion of the airbag 11. The side wall portions 14b are in the form of a substantially hexagonal cylinder to extend downward from near an outer peripheral edge of the roof wall portion 14a. The side wall portions 14b have latch portions 14c (see FIG. 2) formed at predetermined positions on an inner peripheral surface thereof. The latch portions 14c engage latch pawls 17a provided on side wall portions 17 of the bag holder 15 described later. Also, The roof wall portion 14a has a plurality of ribs formed at an underside thereof, which abut against mount pieces 18 (movable bases 43) of the bag holder 15 and are not shown.

A torus-shaped retainer 12 is arranged within the airbag 11. The retainer 12 is provided with four downwardly extending bolts 12a, for example(see FIGS. 3 and 4). The airbag 11 and the inflator 13 are held on the bag holder 15, by inserting these bolts 12a through the airbag 11, the bag holder 15 and the flange portion 13c of the inflator 13 and fastening nuts 12b on them. Also, the pad 14 is held on the bag holder 15 by securement of the side wall portions 14b with rivets 19, for example, and engagement of the latch pawls 17a with the latch portions 14c.

The bag holder 15 is made by die casting with magnesium or the like in consideration of lightening and formativeness. The bag holder 15 comprises, as shown in FIGS. 2 to 5, a lateral plate portion 16 and the side wall portions 17. The lateral plate portion 16 is provided with an insertion hole 16a centrally located thereof, into which the inflator body portion 13a can be inserted from below. The side wall portions 17 are formed to extend vertically from a front edge and both right and left sides near a rear edge of the lateral plate portion 16. Formed around insertion hole 16a of the lateral plate portion 16 are through holes 16b, which permit insertion of the respective bolts 12a of the retainer 12.

Formed at predetermined positions on the respective side wall portions 17 are the latch pawls 17a adapted to be engaged by the latch portions 14c on the pad wall portions 14b. Also, mount holes 17b (see FIG. 2) are formed at predetermined positions on the side wall portions 17 to be used upon securement of the side wall portions 14b with the rivets 19.

Formed at upper ends of the respective side wall portions 17 are three mount pieces 18 extending laterally outward. The mount pieces 18 are formed integrally with the bag holder 15. These respective mount pieces 18 constitute the movable bases 43, described later, of the horn switches H. The respective movable bases 43 are formed with connections 43c. The respective connections 43c are formed with screw holes 43a for fastening of connecting bolts 53 described later.

Also, a lead wire (not shown) is connected to the bag holder 15 for conduction to a positive electrode side of a horn actuating circuit.

Figure 11:
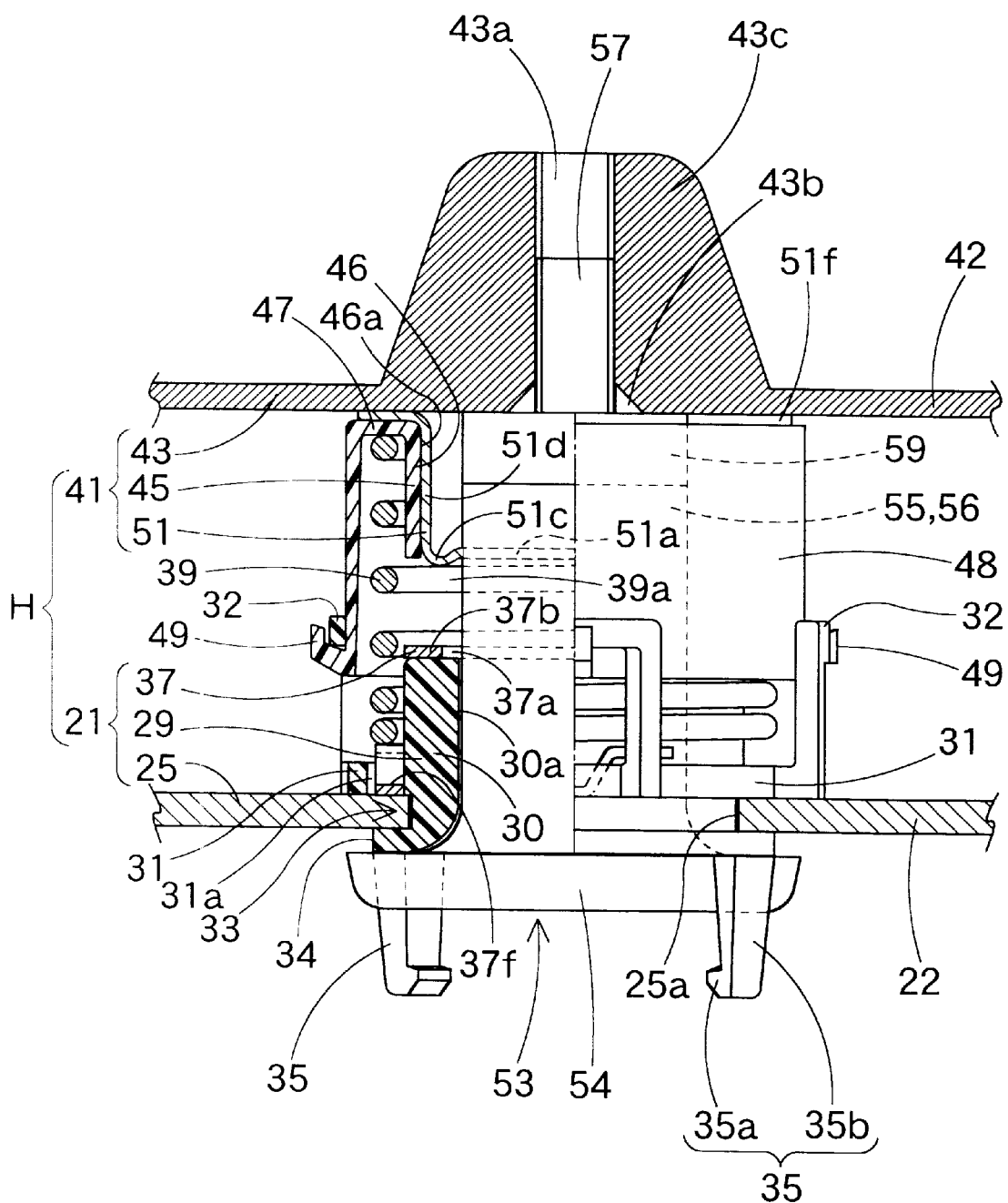
FIG. 11 is an enlarged, partial side view in partial cross section showing the use of the horn switch.
Figure 12:
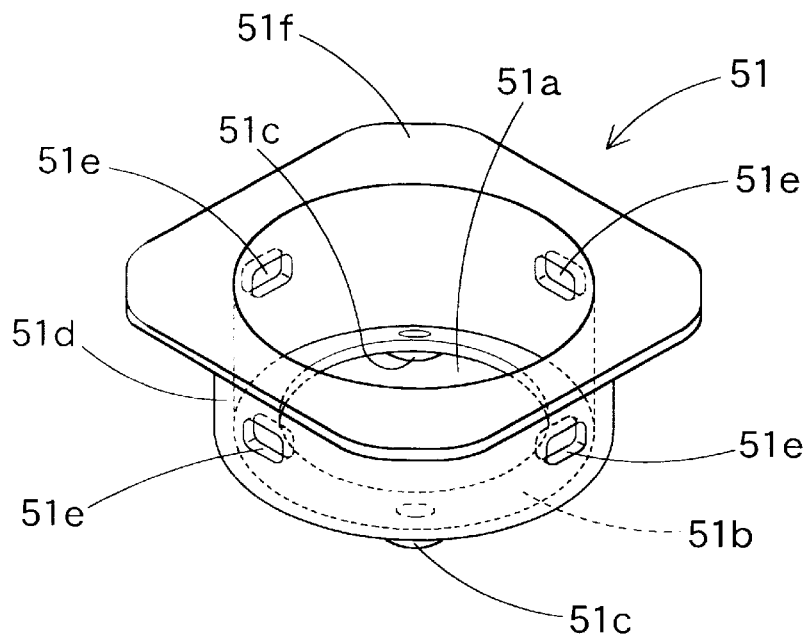
FIG. 12 is a perspective view showing a movable contact.
Figure 13:
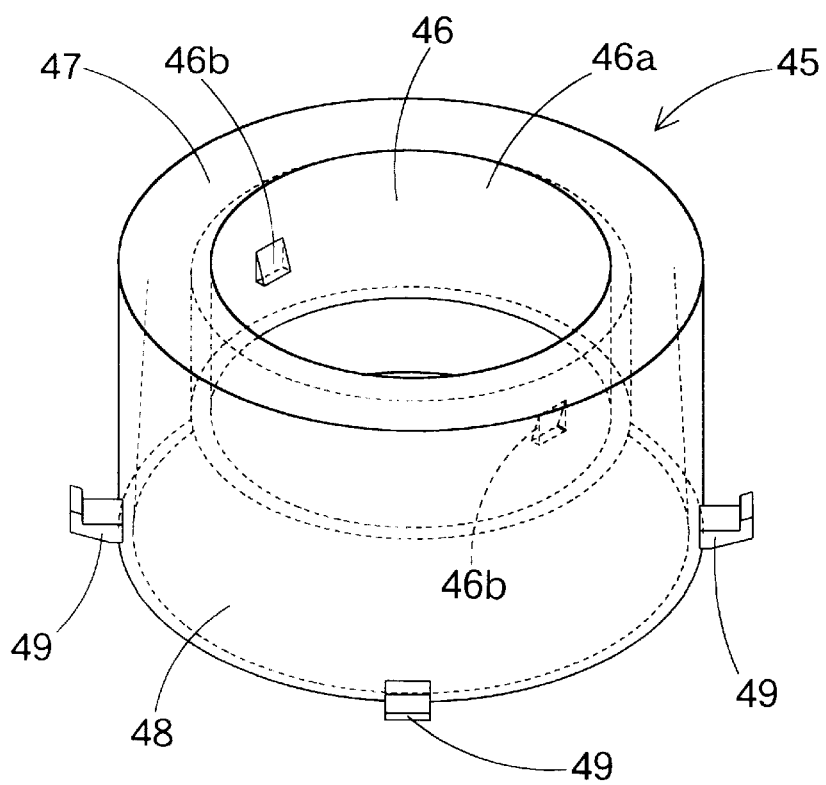
FIG. 13 is a perspective view showing a movable supporting member.
Figure 14:
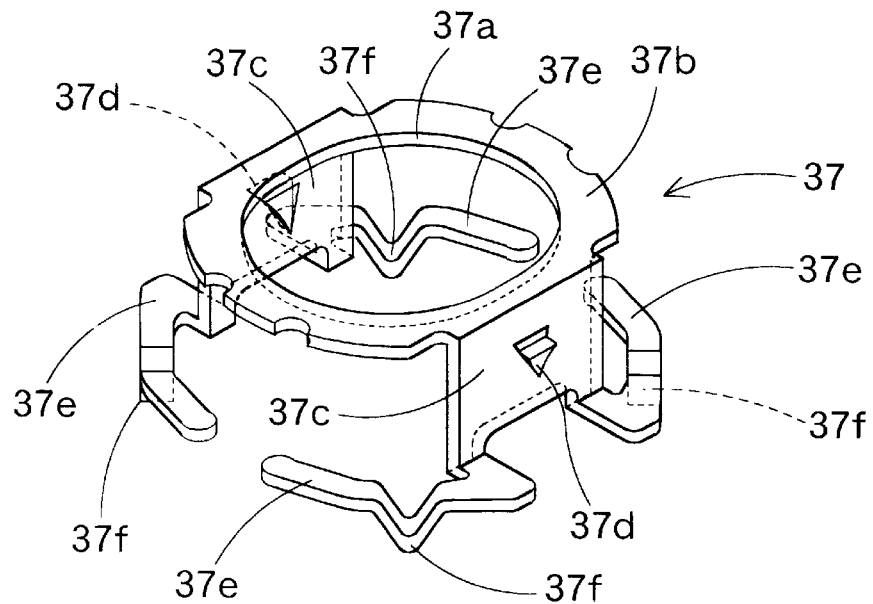
FIG. 14 is a perspective view showing a stationary contact.
Figure 15:
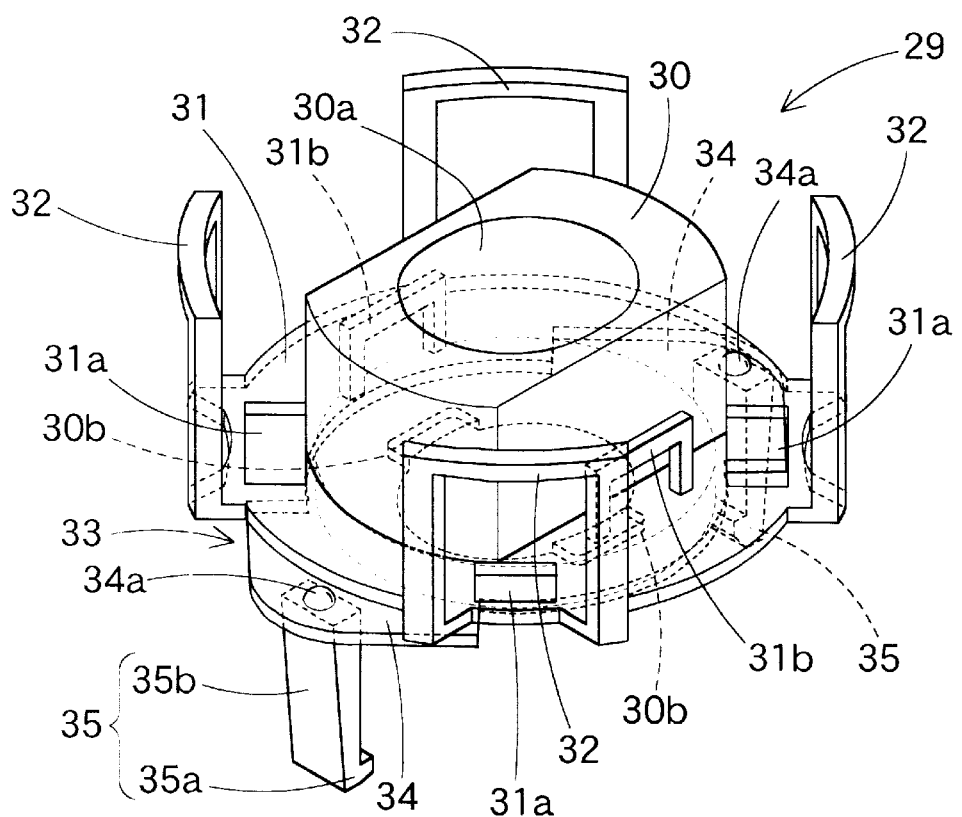
FIG. 15 is a perspective view showing a stationary supporting member.
Figure 16:
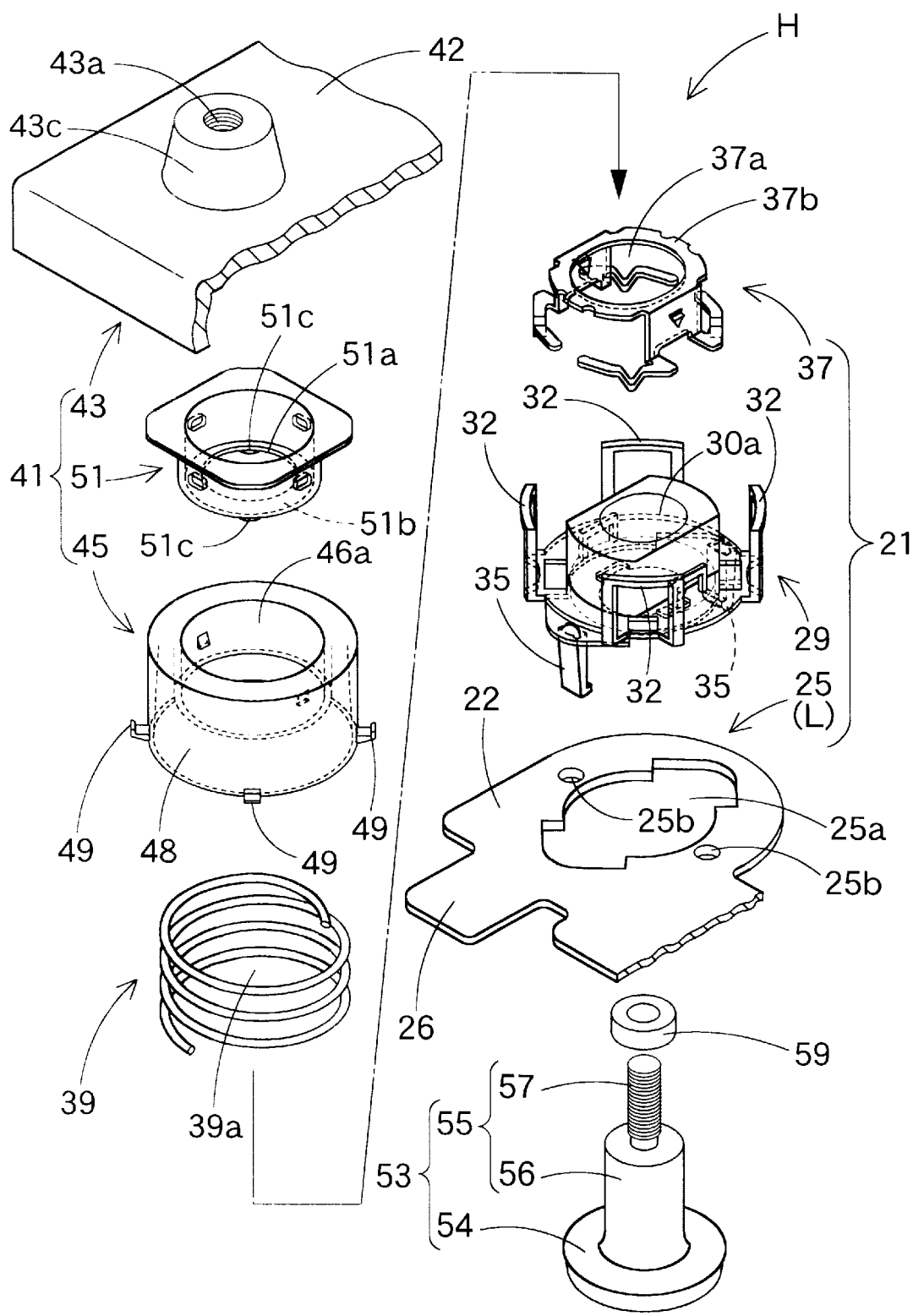
FIG. 16 is an exploded, perspective view showing the horn switch.

The horn switches H in the embodiment are arranged at three locations on a back surface of the peripheral edge of the pad 14 near the respective spoke sections S, as shown in FIGS. 1 to 4. The respective horn switches H comprise a stationary member 21, a movable member 41, a spring 39 and a connecting bolt 53, as shown in FIGS. 11 and 16. The stationary member 21 has a stationary contact 37 and is supported on the steering wheel body 1. The movable member 41 has a movable contact 51 and is arranged above the stationary member 21. The movable contact 51 touches the stationary contact 37 to enable operation of the horn. The spring 39 is in the form of a coil spring and is arranged between the stationary member 21 and the movable member 41. Of course, any suitable biasing mechanism could be used. The spring 39 biases the movable contact 51 upward in a manner to separate the same from the stationary contact 37. The connecting bolt 53 connects the movable member 41 to the stationary member 21. The connecting bolt 53 allows downward movement of the movable member 41 and prescribes a distance of the movable contact 51 from the stationary contact 37.

Also, the stationary member 21 comprises, as shown in FIGS. 11 and 16, a stationary base 25 and a stationary support member 29 for supporting the stationary contact 37. The stationary base 25 is connected to the steering wheel body 1. The stationary support member 29 is connected to the stationary base 25.

Figure 4:
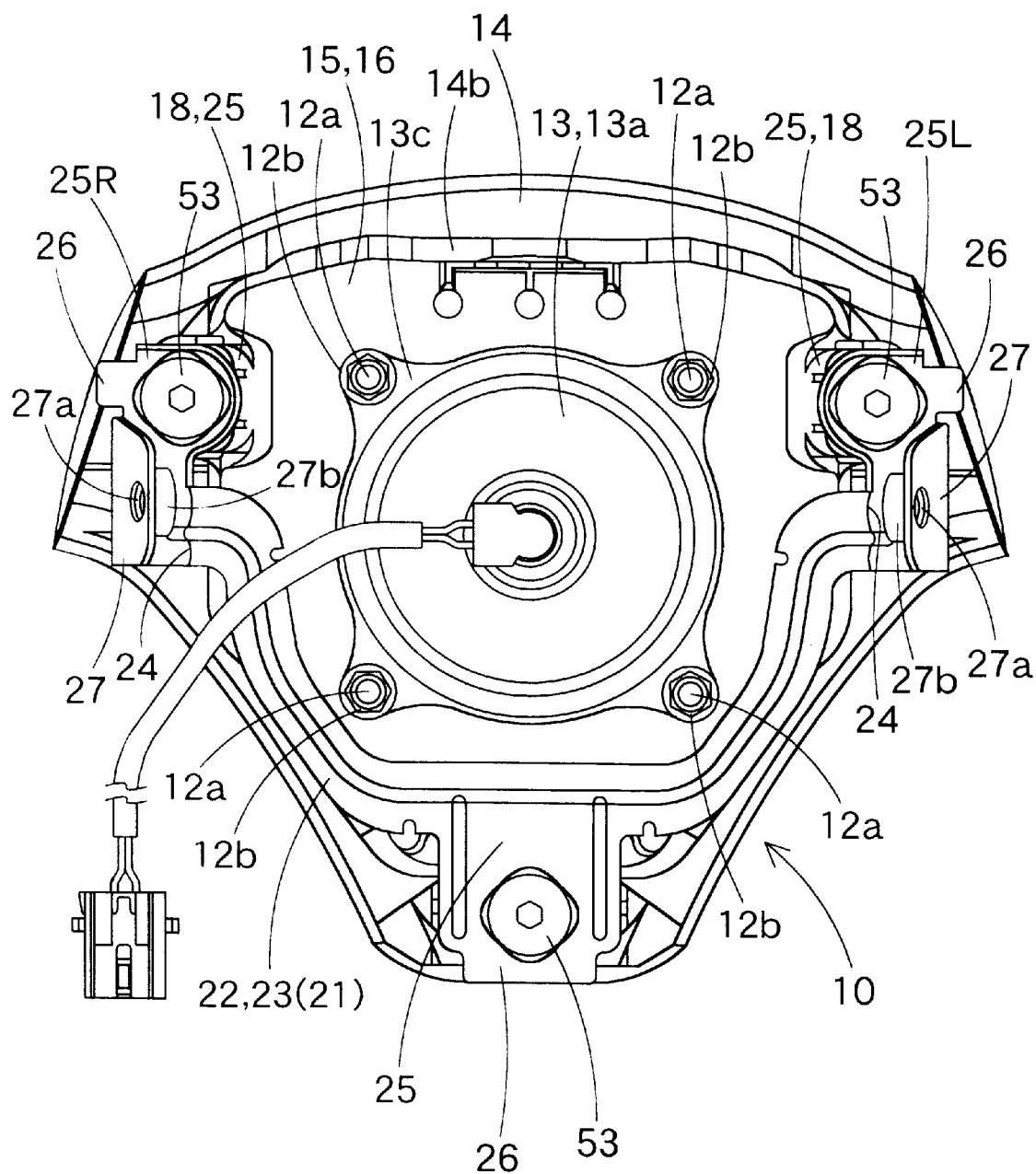
FIG. 4 is a bottom view showing an airbag device, to which the horn switch is mounted.
Figure 5:
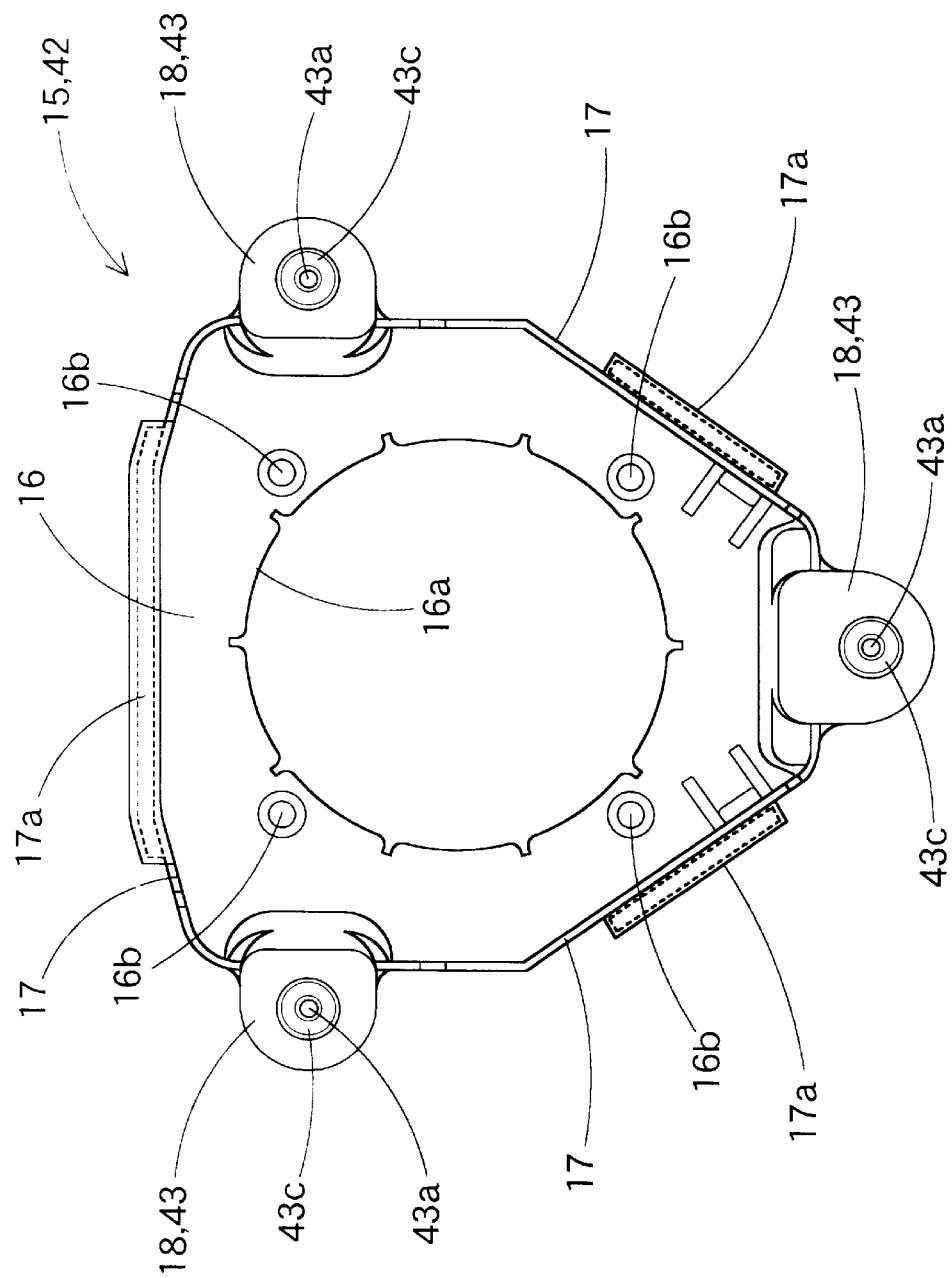
FIG. 5 is a plan view showing a movable plate of a movable member on the horn switch.
Figure 6:
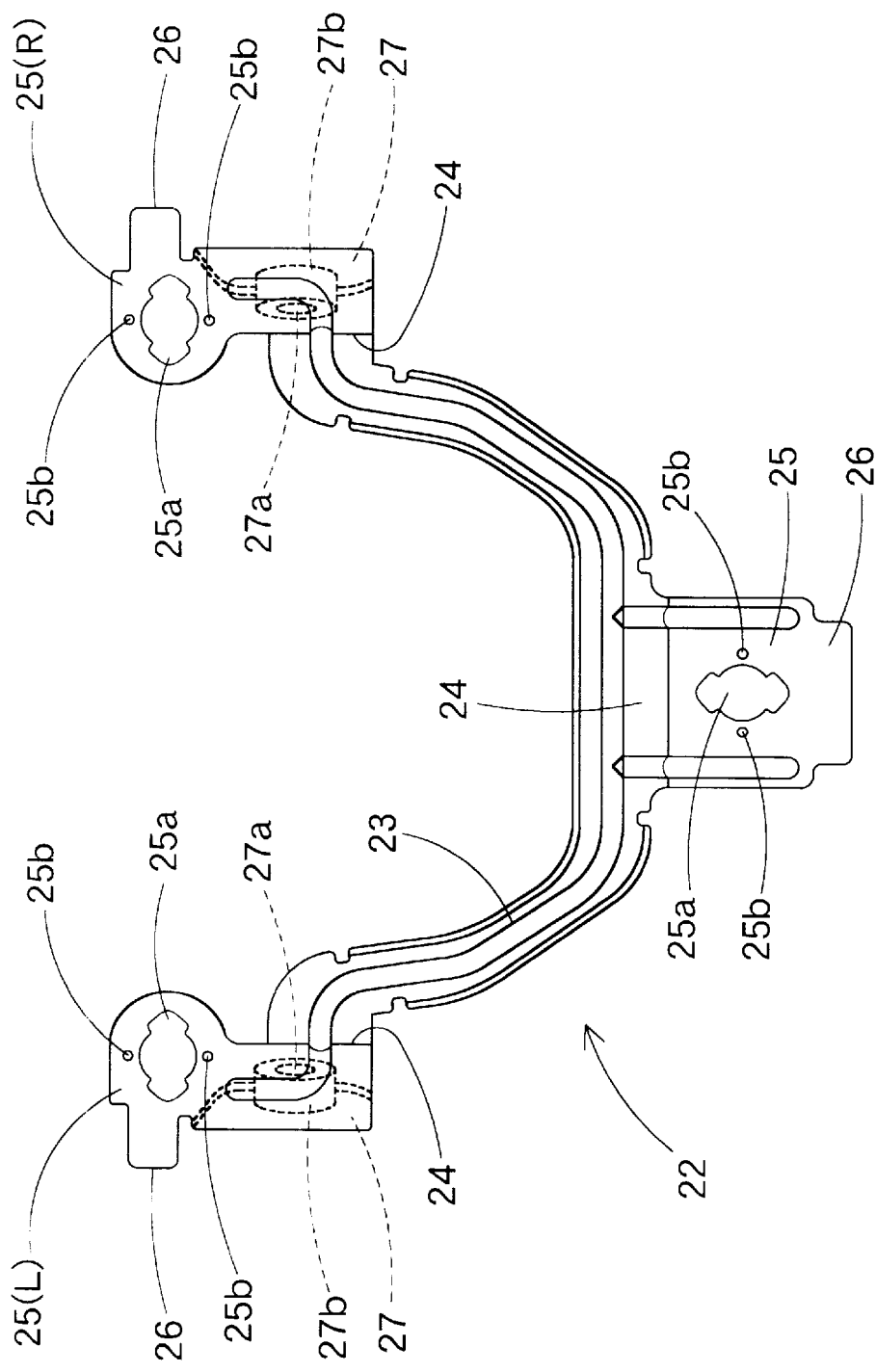
FIG. 6 is a plan view showing a stationary plate of a stationary member on the horn switch.
Figure 7:
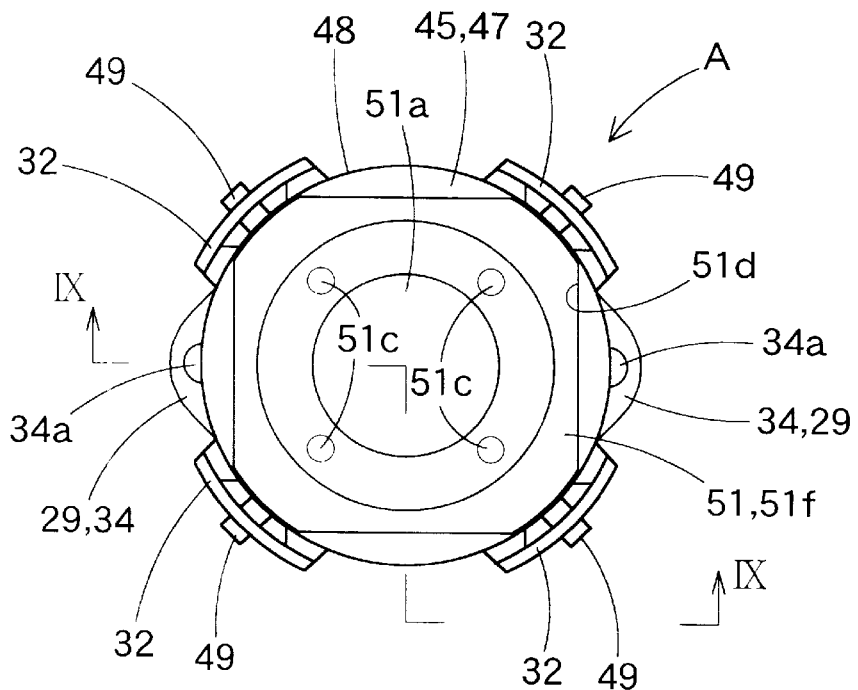
FIG. 7 is a plan view showing a switch assembly.
Figure 8:
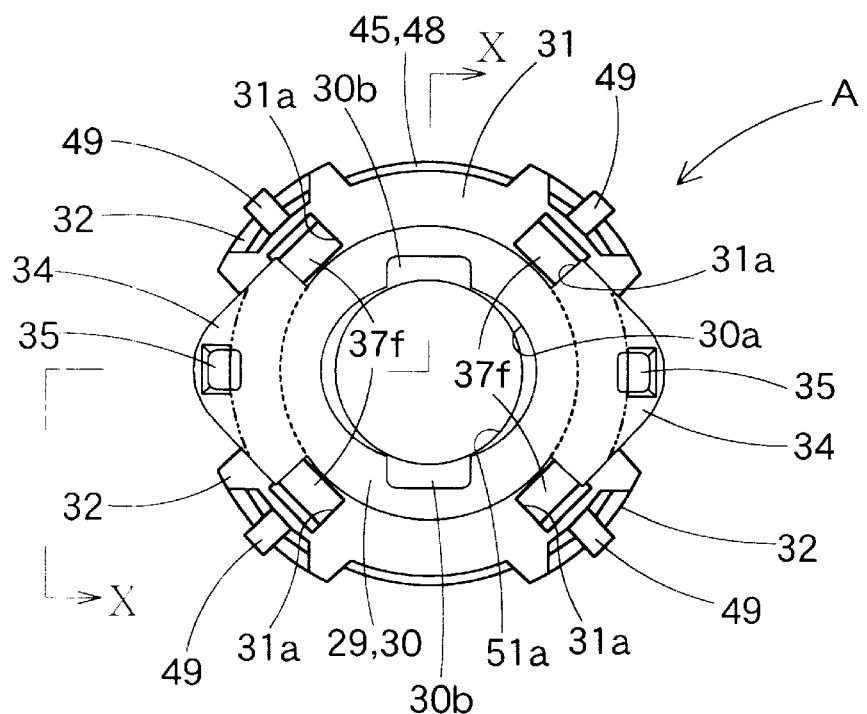
FIG. 8 is a bottom view showing the switch assembly.
Figure 9:
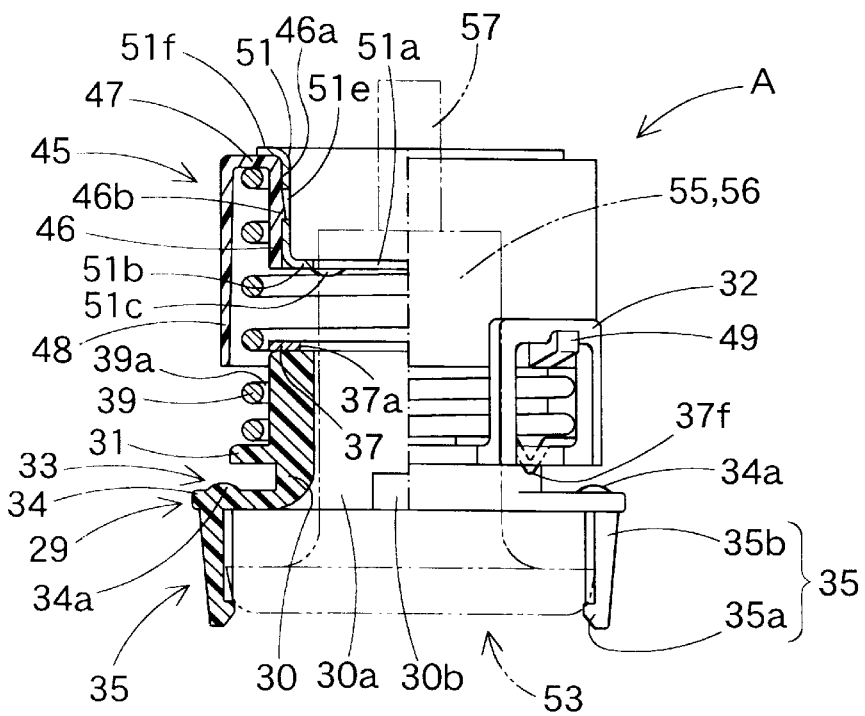
FIG. 9 is a side view in partial cross section of the switch assembly taken along the line IX—IX in FIG. 7.
Figure 10:
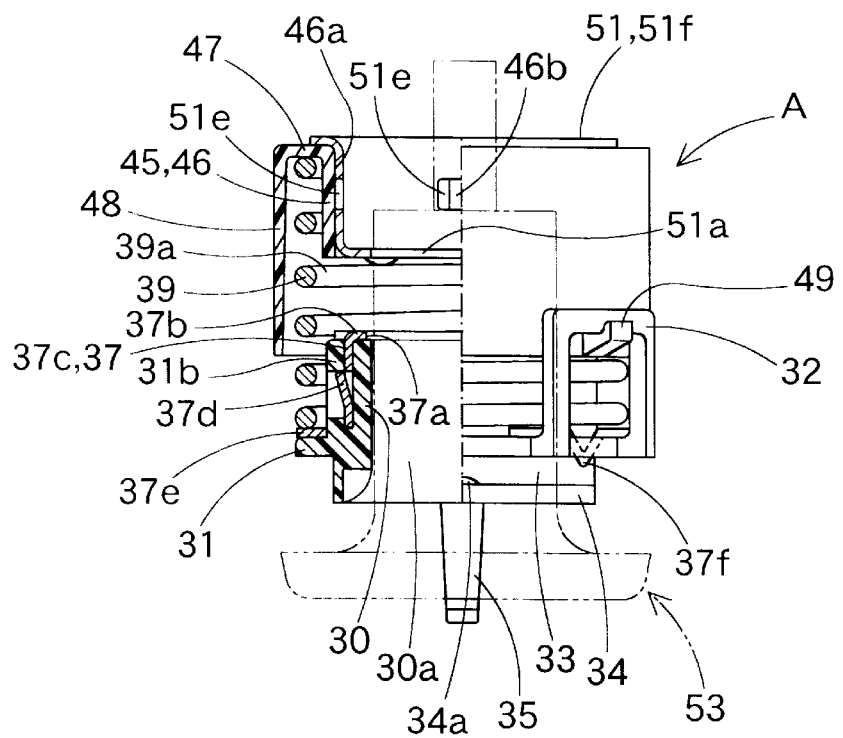
FIG. 10 is a side view in partial cross section of the switch assembly taken along the line X—X in FIG. 8.

In addition, with the embodiment, the stationary bases 25 are formed to be connected to a single stationary plate 22 made of sheet metal at three locations as shown in FIGS. 1, 4, and 6. The stationary plate 22 preferably comprises a connecting rod 23, three longitudinal plate portions 24, and three stationary bases 25. The connecting rod 23 is formed to be U-shaped as viewed from above. The respective longitudinal plate portions 24 are arranged to extend upward from the connecting rod 23. The respective stationary bases 25 are arranged to extend laterally outward from upper ends of the respective longitudinal plate portions 24.

As seen in FIG. 6, formed centrally on the respective stationary bases 25 are mount holes 25a, which are shaped to have oblique sides with the shape substantially of a right triangle on both sides in symmetric positions around a circular hole. Two latch holes 25b extend through a periphery of the respective mount holes 25a. Also, a support piece portion 26 is formed on an outer edge side of the respective stationary bases 25. The support piece portion 26 abuts against and is supported by the covering layer 6 of the spoke sections S.

Further, formed on two stationary bases 25(L) and 25(R) on a front side of the steering wheel W are connection piece portions 27 which extend downward from outer edges, as shown in FIGS. 3, 4 and 6. Nuts 27b are fixed to the respective connection piece portions 27. Formed on the respective nuts 27b are thread holes 27a for fixing the stationary bases 25(L) and 25(R), and thereby the stationary plate 22, on the spoke section core metals 5(L) and 5(R) by means of bolts 8.

The respective stationary support members 29 are formed from a synthetic resin, such as polyacetal, having an insulating property. The respective stationary support members 29 are substantially cylinder-shaped and have an insertion hole 30a extending through a central portion thereof as shown in FIGS. 7 to 11, 15 and 16. A radially outwardly extending flange portion 31 and latch plate portions 34 are arranged on a lower portion of a substantially cylinder-shaped cylinder portion 30, and are spaced from each other in a vertical direction.

The flange portions 31 are ring-shaped. Through holes 31a are formed on the flange portion 31 to be disposed in four positions spaced 90° from one another. The respective through holes 31a extend in a vertical direction. Inserted through the respective through holes 31a are projections 37f of contact portions 37e, described later, of stationary contacts 37. Also, latch ring portions 31b are formed on the flange portion 31 to be disposed in symmetric positions about the cylinder portion 30. The respective latch ring portions 31b engage raised pawls 37d, described later, of the stationary contact 37. Further, four upwardly extending ring portions 32 are provided upright on an outer peripheral edge of the flange portion 31 to be disposed in the vicinity of the respective through holes 31a. The respective ring portions 32 constitute engagements for engaging latch piece portions 49, described later, of movable support members 45. Switch assemblies A can be formed by engaging of the respective latch piece portions 49 on the respective ring portions 32. In addition, the flange portion 31 also serves as a spring seat, which has the contact portions 37e of the stationary contact 37 resting thereon to support a lower end of the spring 39.

The latch plate portions 34 corporate with a lower end surface of the cylinder portion 30 to assume a configuration of a triangle plate so as to correspond to a configuration of the mount hole 25a of the stationary base 25. There are two latch plate portions 34 arranged in symmetric positions about the cylinder portion 30. The respective latch plate portions 34 have substantially semi-spherical latch projections 34a formed at upper surfaces thereof.

The respective latch plate portions 34 are formed with latch legs 35 which extend downward from an underside thereof. The latch legs 35 are provided with a stub portion 35b and a hook portion 35a which bends inward at a lower end of the stub portion 35b. The hook portion 35a latches a lower surface of a head 54, described later, of the connecting bolt 53. In addition, the stub portions 35b of the respective latch legs 35 are larger in length than the heads 54, and have a length such that in a state in which the head 54 is latched by the hook portion 35a an upper end of a male thread portion 57, described later, of the connecting bolt 53 slightly extends above the movable support member 45, described later, of the switch assembly A.

The spacing between the flange portion 31 and the latch plate portions 34 is set to be substantially equal to the plate thickness of the stationary base 25. The flange portion 31, the latch plate portions 34 and the cylinder portion 30 therebetween constitute a joint portion 33 for bayonet-joining the stationary support member 29 to the mount hole 25a of the stationary base 25. More specifically, the latch plate portions 34 and a lower portion of the cylinder portion 30 are inserted through the mount hole 25a. Then the stationary support member 29 is turned 90°. At this time, a peripheral edge of the mount hole 25a is interposed between the flange portion 31 and the latch plate portions 34. When the stationary. support member 29 is turned in this way, the stationary support member 29 is bayonet-joined to the mount hole 25a of the stationary base 25. In addition, at the time of such joining, the latch projections 34a of the respective latch plate portions 34 are fitted into the latch holes 25b of the stationary base 25. Fitting of the latch projections 34a into the latch holes 25b cause the stationary support member 29 to be inhibited from turning in a circumferential direction. Also, the cylinder portion 30 has a recess 30b formed at its lower end. The recess 30b is formed to allow a jig or the like to be inserted thereinto so as to facilitate turning the stationary support member 29 at the time of bayonet-joining.

The stationary contacts 37 are formed from spring steel. The stationary contacts 37 are provided with a body portion 37b, vertical wall portions 37c, and four contact portions 37e as shown in FIGS. 7 to 11, 14 and 16. The body portion 37b has an insertion hole 37a extending centrally therethrough and is substantially ring-shaped to be conformed to an upper end of the cylinder portion 30 of the stationary support member 29. The vertical wall portions 37c are formed to extend downward from both edges of the body portion 37b. The respective contact portions 37e are formed to extend from both sides of the lower ends of the respective vertical wall portions 37c in fin-like manner. The respective vertical wall portions 37c are formed with the raised pawls 37d, which are cut off at upper sides thereof. Also, the respective contact portions 37e are formed with projections 37f, which project in a downwardly protruding manner. The stationary contact 37 can be assembled to the stationary support member 29 by fitting the vertical wall portions 37c onto the cylinder portion 30 of the stationary support member 29 while the contact portions 37e are disposed below. At this time, the respective raised pawls 37d are engaged by the latch ring portions 31b to be prevented from separating upwardly from the stationary contact 37. At the time of such assembling, the body portion 37b is supported on an upper end surface of the cylinder portion 30 of the stationary support member 29. The projections 37f of the respective contact portions 37e extend downward from the respective through holes 31a of the stationary support member 29. Thus the projections 37f are brought into contact with the stationary base 25 by bayonet-joining the stationary support member 29, to which the stationary contact 37 is assembled, to the stationary base 25. The stationary contacts 37 are conducted to a negative electrode side of the horn actuating circuit through the projections 37f, the stationary plate 22 and the core metals 5(L), 5(R) when the stationary plate 22 is fixed to the spoke section core metals 5(L), 5(R) by means of the bolts 8.

The respective movable members 41 are provided with the movable base 43 and the movable support member 45, which supports the movable contact 51, as shown in FIGS. 2, 3, 5, 7 to 11 and 16. The movable bases 43 are connected to the pad 14 intended to be depressed in order to activate the horn switch H. The movable support member 45 abuts against the movable base 43 to be connected thereto. In this embodiment, the respective movable bases 43 are composed of three mount pieces 18 on the bag holder 15. The bag holder 15 functions as a single movable plate 42.

As described previously, the respective movable bases 43 are provided with the connection 43c, which is disposed to extend upward from the mount piece. The respective connections 43c have a threaded hole 43a for fastening of the connecting bolt 53, described later formed centrally thereof. The threaded hole 43a has a tapered guide surface 43b (see FIG. 11), which facilitates threading a male thread portion 57 of the connecting bolt 53 into the threaded hole formed at a peripheral edge of a lower end thereof.

The movable support members 45 are composed of a synthetic resin, such as polyacetal, having an insulating property. The respective movable support members 45 are provided with a cylindrical portion 46, a flange portion 47 and a cover portion 48, as shown in FIGS. 7 to 11, 13 and 16. The cylindrical portion 46 is substantially cylinder-shaped and has an insertion hole 46a extending centrally therethrough. The flange portion 47 is ring-shaped to extend outward from an upper end of the cylindrical portion 46. The cover portion 48 is cylinder-shaped, extending downward from an outer peripheral edge of the flange portion 47. Latch projections 46b are provided on two opposite sides of an inner peripheral surface of the cylindrical portion 46. The respective latch projections 46b are arranged to have the movable contact 51 assembled thereto. The flange portion 47 constitutes a spring seat 47 for the upper end of the coil spring 39.

The cover portion 48 extends downward so as to be capable of covering an area surrounding the contact portions, the body portion 37b and the body portion 51c, at which the stationary contact 37 and the movable contact 51 touch each other in operation of the horn switch H. In non-operation, the cover portion 48 also covers surroundings of the contact portions, the body portions 37b and 51c, at which the stationary contact 37 and the movable contact 51 touch each other in operation of the horn switch H. Also, the cover portion 48 covers the coil spring 39. Further, four latch piece portions 49 are provided, projecting from an outer periphery of a lower end of the cover portion 48 and spaced at an angle of 90° from one another. The respective latch piece portions 49 are bent upward at tip ends thereof. These latch piece portions 49 constitute engagements adapted to engage the respective ring portions 32 of the stationary support member 29. The latch piece portions 49 are used when the ring portions 32 and the latch piece portions 49 are made to engage with each other to constitute the switch assembly A. In addition, the ring portion 32 and the latch piece portions 49 are configured not to interfere with each other even when the movable support member 45 is made to approach the stationary support member 29 to actuate the horn.

The movable contacts 51 are formed from spring steel. The movable contacts 51 are provided, as shown in FIGS. 7 to 11, 12 and 16, with a body portion 51b, a vertical wall portion 51d, and a contact portion 51f. The body portion 51b is substantially ring-shaped to have an insertion hole 51a located centrally therein. The vertical wall portion 51d is cylinder-shaped, extending upward from an outer periphery edge of the body portion 51b. The contact portion 51f is in the form of a substantially square-shaped ring extending outward from an upper end of the vertical wall portion 51d. The body portion 51b is provided with four convex portions 51c, which extend downward. The respective convex portions 51c are designed to touch the body portion 37b of the stationary contact 37. The vertical wall portion 51d is formed with latch holes 51e, which are spaced at an angle of 90° from one another. The movable contact 51 is assembled to the movable support member 45 by fitting the vertical wall portion 51d into the cylindrical portion 46 from above. At this time, the latch projections 46b are engaged with the respective latch holes 51e to prevent the movable contact 51 from dislodging in an upward direction. At the time of assembly, the contact portion 51f is supported on an upper surface of the flange portion 47 on the movable support member 45. The convex portions 51c protrude downward from a lower end of the cylindrical portion 46 on the movable support member 45.

The coil springs 39 are substantially cylinder-shaped and are provided centrally thereof with an insertion hole 39a as shown in FIGS. 9 to 11 and 16. The coil spring 39 has its upper end abutting against the flange portion 47 of the movable support member 45. Also, the coil spring 39 has its lower end abutting against the flange portion 31 of the stationary support member 29 with the contact portions 37e of the stationary contact 37 therebetween.

The connecting bolts 53 comprise, as shown in FIGS. 11 and 16, the disk-shaped head 54, and a shank portion 55 extending upward from the head 54. The shank portion 55 is provided with a male thread portion 57 capable of threading into the threaded holes 43a of the movable bases 43 at the upper end. The shank portion 55 has a columnar-shaped large-diameter portion 56 formed at its lower end. The large-diameter portion 56 is larger in outer diameter than the male thread portion 57 and smaller in outer diameter than the head 54. The outer diameter of the head 54 is made larger than the inner diameters of the insertion holes 37a, 51a, 30a, 46a, 39a respectively of the stationary contact 37, the movable contact 51, the stationary support member 29, the movable support member 45, and the spring 39, which constitute the switch assembly A. The head 54 is formed such that its lower surface can be latched by the latch legs 35 of the stationary support member 29. Also, the outer diameter of the shank portion 55 is set to be smaller than the inner diameter of the insertion holes 37a, 51a, 30a, 46a, 39a.

In addition, in this embodiment, the connecting bolt 53 is fastened to the threaded hole 43a with the use of a washer 59. The washer 59 is formed to have an outer diameter equal to the outer diameter of the large-diameter portion 56.

At the time of fastening of the connecting bolt 53, the large-diameter portion 56 abuts against a peripheral edge of the threaded hole 43a on an underside of the movable base 43 with the washer 59 therebetween. Also, an upper surface of the head 54 abuts against a peripheral edge of the mount hole 25a on an underside of the stationary base 25 with the latch plate portions 34 of the stationary support member 29 therebetween. At this time, the stationary contact 37 and the movable contact 51 are disposed away from each other by the bias of the coil spring 39 to prescribe a horn stroke. The horn stroke is the distance between the body portion 37b and the convex portions 51c, at which the stationary contact 37 and the movable contact 51 touch each other. Incidentally, the distance between the body portion 37b and the convex portions 51c, at which the stationary contact 37 and the movable contact 51 touch each other, when the engaging portions 32, 49 are made to engage with each other to assemble the switch assembly A, is set to be somewhat larger than that at the time of fastening of the connecting bolt 53.

Assembly of the switch assembly A is performed in the following manner. First, the raised pawls 37d are engaged by the latch ring portions 31b to assemble the stationary contact 37 to the stationary support member 29. Also, the latch projections 46b are engaged by the respective latch holes 51e to assemble the movable contact 51 to the movable support member 45.

Next, the lower end of the coil spring 39 is made to abut against the flange portion 31 with the contact portions 37e of the stationary contact 37 therebetween. Then the coil spring 39 is positioned in a manner to make the upper end thereof abut against the underside of the flange portion 47 of the movable support member 45. The stationary support member 29 and the movable support member 45 are made to approach each other to have the latch piece portions 49 engaged by the respective ring portions 32, thus enabling assembly of the switch assembly A.

The connecting bolt 53 together with the washer 59 is assembled to the switch assembly A by inserting the shank portion 55 through the insertion holes 37a, 51a, 30a, 46a, 39a and latching the lower surface of the head 54 on the latch legs 35. Next, the joint portion 33 of the stationary support member 29 is made to bayonet-join to the mount hole 25a of the stationary base 25. In this way, the three switch assemblies A and the connecting bolts 53 are mounted to the stationary plate 22.

In addition, the connecting bolts 53 and the washers 59 may be mounted making use of the latch legs 35 after mounting of the three switch assemblies A to the stationary plate 22.

Then the respective movable bases 43 (the mount pieces 18) of the movable plate 42, which constitute the bag holder 15 of the airbag device 10 assembled beforehand, are disposed above the respective switch assemblies A. The respective connecting bolts 53 are turned from below to thread the male thread portions 57 into the respective threaded holes 43a of the movable bases 43. Thus the airbag device 10 can be formed having three horn switches H inclusive of the stationary plate 22 mounted thereto.

In addition, mounting of the horn switches H to the airbag device 10 is actually performed by turning the airbag device 10 upside down and placing the same on a working bench or the like. The stationary plate 22 is placed above the airbag device 10 with the respective male thread portions 57 projecting from the lower side thereof. Then the respective connecting bolts 53 are fastened to the movable bases 43.

Incidentally, assembly of the airbag device 10 is performed in the following manner. First, the retainer 12 is placed in the airbag 11 as described previously and the airbag 11 is folded. Subsequently, the respective bolts 12a extended from the retainer 12 are inserted through the bag holder 15 and the flange portion 13c to be engaged by the nuts 12b. Further, the latch pawls 17a of the side wall portions 17 are engaged by the latch portions 14c on the pad wall portions 14b to fix the pad wall portions 14b to the side wall portions 17 by means of the rivets 19.

After the horn switch H inclusive of the stationary plate 22 is mounted to the airbag device 10 in this way, the respective connection piece portions 27 of the stationary bases 25(L) and 25(R) are placed against the spoke section core metals 5(L) and 5(R) and the bolts 8 are inserted through the core metals 5(L) and 5(R) from back sides thereof. Then the bolts 8 are threaded into the thread holes 27a of the connection piece portions 27 to enable assembly of the steering wheel W.

In addition, prior to the time of such assembly, the boss 4a of the boss core metal 4 is connected to the steering shaft of a vehicle.

Also, when the connecting bolt 53 is threaded into the threaded hole 43a, the contact portion 51f on the movable contact 51 for the horn switch H is brought into pressure contact with the peripheral edge of the threaded hole 43a of the movable base 43 by the bias of the coil spring 39. Then the movable contact 51 is conducted to a positive electrode side of the horn actuating circuit through a lead wire (not shown) connected to the movable plate 42 (the bag holder 15). Also, when the stationary plate 22 is fixed to the core metals 5(L), 5(R) by the bolts 8, the stationary contacts 37 of the respective horn switches H are conducted to a negative electrode side of the horn actuating circuit through the projections 37f of the contact portions 37e, the stationary plate 22 and the core metals 5(L), 5(R).

With the steering wheel W assembled in the above-mentioned manner, the pad 14 is pressed to depress the airbag device 10, the movable members 41 are made to approach the stationary member 21 against the bias of the coil springs 39, and the convex portions 51c on the body portion 51b of the movable contact 51 are made to touch the body portion 37b of the stationary contact 37 to actuate the horn.

Also, when the inflator 13 is actuated, an expansion gas from the inflator 13 flows into the airbag 11 to cause the same to push the roof wall portion 14a of the pad 14 open, thus substantially expanding the airbag.

With the horn switch H according to this embodiment, the connecting bolts 53 are temporarily fixed to the stationary member 21. More specifically, the connecting bolts 53 have the lower surface of the head 54 latched by the latch legs 35 in a state of being able to be threaded into the threaded holes 43a on the movable members 41. Therefore, even if a connecting bolt 53 becomes loose, the lower surface of the head 54 is latched by the latch legs 35 to eliminate the possibility of its falling from the assembly.

Of course, when fastened to the movable member 41, the connecting bolt 53 is temporarily fixed to the stationary member 21 with the lower surface of the head 54 latched. At this time, the shank portion 55 extending from the head 54 extends toward the threaded holes 43a on the movable members 41. The connecting bolt 53 can be fastened to the movable members 41 by simply mounting a jig, such as a driver or the like, on the head 54 of the connecting bolt 53 and pushing and turning the same. At this time, the male thread portion 57 of the connecting bolt 53 is fitted into the threaded hole 43a to be positioned, thus eliminating any trouble that the connecting bolt 53 deviates.

Accordingly, with the horn switch H on the steering wheel W, according to this embodiment, it is possible to prevent falling of the connecting bolt 53 even if it becomes loose. Also, with the horn switch H on the steering wheel W, according to this embodiment, it is possible to easily perform the fastening operation of the connecting bolt 53.

With the horn switch H according to this embodiment, the latch legs 35 for temporarily fixing the connecting bolt 53 are formed on the latch plate portions 34. The latch plate portions 34 extend downward past the underside of the stationary base 25 from the stationary support member 29 adapted to bayonet-join to the stationary base 25. Therefore, the latch legs 35 provided on the stationary support member 29 are mounted to the stationary base 25 by joining the joint portion 33 of the stationary support member 29, which supports the stationary contact 37, to the mount hole 25a of the stationary base 25. Accordingly, it is not necessary to separately assemble any member for temporary fixation of the connecting bolt 53 on the stationary member 21. As a result, it is possible to reduce the number of constituent parts and man-hours for assembly of the horn switch H. Of course, if such matter is not taken account of, temporary fixing members similar to the latch legs 35 may be separately mounted on the stationary base 25 itself.

Also, with the horn switch H according to the embodiment, the switch assembly A is formed in a state in which the stationary support member 29 and the movable support member 45, which support the stationary contact 37 and the movable contact 51, respectively, interpose therebetween the spring 39. At this time, the engaging portions 32 and 49 engage with each other in a state in which the movable support member 45 is allowed to move downward. Therefore, it is possible to handle the switch assembly A without the loss of the stationary and movable contacts 37, 51, the stationary and movable support members 29, 45, and the spring 39, which is convenient in handling, such as mounting to the stationary base 25 thereafter. The stationary and movable contacts 37, 51, the stationary and movable support members 29, 45, and the spring 39, which constitute the switch assembly A, are in the form of a cylinder provided with the insertion holes 37a, 51a, 30a, 46a, 39a, through which the shank portion 55 of the connecting bolt 53 is insertable. Therefore, there is no possibility of interfering with the connecting bolt 53, which is to be temporarily fixed to the stationary member 21.

Further, with the horn switch H according to this embodiment, the cover portion 48 provided on the movable support member 45 covers an area surrounding the contact portions 37b and 51c at which the stationary contact 37 and the movable contact 51 touch each other, in operation of the horn switch H. The cover portion 48 covers an area surrounding the contact portions 37b, 51c, at which the stationary contact 37 and the movable contact 51 touch each other, in non-operation. Therefore, foreign matters can be prevented from entering between the contact portions 37b, 51c, at which the stationary contact 37 and the movable contact 51 touch each other in operation of the horn switch. In addition, such a cover portion 48 may be provided on a side of the stationary support member 29.

Moreover, with the horn switch H according to this embodiment, the movable bases 43 on the movable members 41 are constituted as the mount pieces 18 of the bag holder 15 in the airbag device 10. The airbag device 10 is connected to the movable bases 43 to be supported thereon. Therefore, when the airbag device 10 and the horn switch H are beforehand assembled together, the airbag device 10 and all other parts can be mounted to the steering wheel body 1 making use of the respective connection piece portions 27 on the stationary plate 22 on a side of the stationary member 21 of the horn switch H. As a result, it becomes easy to assemble the steering wheel body 1. That is, in the case of directly mounting a small horn switch H on a side of a large steering wheel body 1, the ring section R of the steering wheel body 1 creates interference, making it difficult to assemble. However, in the case of mounting a horn switch H on an airbag device 10 smaller than a steering wheel body 1, fewer parts create interference, making it easier to assemble. This is because it is easy to find any part or parts which fall.

Further, with the horn switch H according to the embodiment, when the connecting bolt 53 is fitted into the threaded hole 43a, they interpose therebetween the washer 59 so that the large-diameter portion 56 abuts directly against the movable base 43. Therefore, when the connecting bolt 53 is fastened, interposition of the movable support member 45 and the movable contact 51 is eliminated. As a result, the movable support member 45 and the movable contact 51 will not be deformed. Of course, the connecting bolt 53 is threaded into the threaded hole 43a with the washer 59 therebetween, and so it is possible to fasten the connecting bolt 53 to the movable base 43 in a state in which fastening forces are enhanced by the washer 59.

Further, with the horn switch H according to the embodiment, the engaging portions 32, 49, at which the stationary support member 29 and the movable support member 45 engage with each other when the switch assembly A is formed, are formed in four locations spaced at an angle of 90° from one another. Therefore, the stationary support member 29 and the movable support member 45 can be stably engaged with each other. In addition, for such function and effect, it suffices to provide the engaging portions 32, 49, at which the stationary support member 29 and the movable support member 45 engage with each other, in three or more locations spaced uniformly from one another around the connecting bolt 53.

While advantageous embodiments have been chosen to illustrate the invention, it will be understood by those skilled in the art that various changes and modifications can be made therein without departing from the scope of the invention as defined by the appended claims.

What is claimed is:

1. A horn switch for a steering wheel that has a steering wheel body, comprising:

a stationary member having a stationary contact and an underside, wherein the stationary member is supported on the steering wheel body;

a movable member having a movable contact and a threaded hole, wherein the movable member is positioned above the stationary member, wherein the movable contact selectively touches the stationary contact to actuate a horn;

a spring arranged between the stationary member and the movable member, wherein the spring biases the movable contact upward to space the movable contact away from the stationary contact; and a connecting bolt, which connects the movable member to the stationary member to allow downward movement of the movable member and to prescribe a distance of the movable contact form the stationary contact, the connecting bolt comprising a head abutting against the underside of the stationary member when the movable member is in a first position and a shank extending upward from the head to be fastened to the threaded hole in the movable member, wherein the connecting bolt is temporarily fixed to the stationary member so that the connecting bolt can be fastened to the movable member and the stationary member has a latch that selectively engages the head of the connecting bolt.

2. The horn switch for a steering wheel, according to claim 1, wherein the shank of the connecting bolt comprises:

a male thread portion formed at an upper end of the connecting bolt having an outer diameter to be threaded into the threaded hole;

a large-diameter portion formed at a lower end of the connecting bolt with an outer diameter larger than the outer diameter of the male thread portion; and a washer, wherein the connecting bolt is adapted to be threaded into the threaded hole with the washer, the washer having an outer diameter that is the same as the outer diameter of the large-diameter portion, and being disposed between the large-diameter portion and the movable member.

3. The horn switch for a steering wheel, according to claim 1, wherein the movable member connects and supports an airbag device.

4. The horn switch for a steering wheel, according to claim 3, wherein the movable base is formed integrally with a bag holder in the airbag device, wherein the bag holder is made by die casting.

5. A horn switch for a steering wheel, comprising:

a stationary member having a stationary contact and an underside, wherein the stationary member is supported on the steering wheel body;

a movable member having a movable contact and a threaded hole, wherein the movable member is positioned above the stationary member, wherein the movable contact selectively touches the stationary contact to actuate a horn;

a spring arranged between the stationary member and the movable member, wherein the spring biases the movable contact upward to space the movable contact away from the stationary contact; and a connecting bolt, which connects the movable member to the stationary member to allow downward movement of the movable member and to prescribe a distance of the movable contact form the stationary contact, the connecting bolt comprising a head abutting against the underside of the stationary member when the movable member is in a first position and a shank extending upward from the head to be fastened to the threaded hole in the movable member, wherein the connecting bolt is temporarily fixed to the stationary member so that the connecting bolt can be fastened to the movable member, wherein the stationary member comprises:

a stationary base connected to the steering wheel body wherein the stationary base includes the underside; and a stationary support member connected to the stationary base and supporting the stationary contact, wherein the stationary support member includes a joint portion capable of joining to a mount hole in the stationary base, the stationary support member having a plurality of latch legs which project below the underside of the stationary base, wherein when the joint portion is joined with the mount hole of the stationary base, the latch legs are capable of temporarily fixing the connecting bolt.

6. The horn switch for a steering wheel, according to claim 5, wherein a cover portion is formed on one of the stationary support member or the movable support member to cover an area surrounding a plurality of contact portions where the stationary contact and the movable contact touch with each other to enable operation of the horn switch.

7. The horn switch for a steering wheel, according to claim 5, wherein the movable member comprises:

a movable base and a pad connected to the movable base, wherein the pad is depressed to operate the horn switch, the movable base having a threaded hole; and a movable support member connected to the movable base to support the movable contact, wherein the stationary contact, the movable contact, the stationary support member, the movable support member and the spring are formed to have a substantially cylindrical shape provided with an insertion hole which permits the shank of the connecting bolt to be inserted therethrough, and wherein the stationary support member and the movable support member which support the stationary contact and the movable contact, respectively, engage each other to form a switch assembly with the spring interposed therebetween to allow downward movement of the movable member.

8. The horn switch for a steering wheel, according to claim 7, wherein a cover portion is formed on one of the stationary support member or the movable support member to cover an area surrounding a plurality of contact portions where the stationary contact and the movable contact touch with each other to enable operation of said horn switch.

9. The horn switch for a steering wheel, according to claim 7, wherein the threaded hole in the movable base has a tapered guide surface formed at a peripheral edge of a lower end thereof.

10. The horn switch for a steering wheel, according to claim 7, wherein the stationary support member and the movable support member are each formed with a plurality of engagements that connect the stationary support member and the movable support member, wherein the engagements are formed around the connecting bolt in four positions spaced circumferentially uniformly from one another.

11. A steering wheel, comprising:

a steering wheel body;

a plurality of connectors supported by the steering wheel body;

a pad coupled to the connectors to be movable with respect to the steering wheel body; and an airbag assembly supported by the connectors, wherein each connector includes a stationary member having a contact coupled to the steering wheel body, a movable member having a contact biased from the stationary member so that the contacts selectively touch to activate the horn upon depression of the pad, and a connecting member extending through the stationary member, wherein the connecting member is retained by the stationary member in a first position and is retained by the movable member in a second position and the connector has latch legs that hold the connecting member in the first position.

12. The steering wheel of claim 11, wherein the connecting member is a threaded bolt with a head and the latch legs temporarily retain the head.

* * * * *